US006866047B1

(12) United States Patent
Marvin

(10) Patent No.: US 6,866,047 B1
(45) Date of Patent: Mar. 15, 2005

(54) ON-SITE CONCRETE TRUCK WASH-OUT APPARATUS

(75) Inventor: Barry C. Marvin, Maple Ridge (CA)

(73) Assignee: Ocean Construction Supplied Limited, Vancouver (CA)

( * ) Notice: Subject to any disclaimer, the term of this patent is extended or adjusted under 35 U.S.C. 154(b) by 0 days.

(21) Appl. No.: 09/937,772

(22) PCT Filed: Mar. 30, 2000

(86) PCT No.: PCT/CA00/00350

§ 371 (c)(1),
(2), (4) Date: Feb. 11, 2002

(87) PCT Pub. No.: WO00/59638

PCT Pub. Date: Oct. 12, 2000

(30) Foreign Application Priority Data

Mar. 30, 1999 (CA) .............................................. 2267582

(51) Int. Cl.$^7$ ................................................ B08B 3/02
(52) U.S. Cl. .................. 134/22.1; 134/166 R; 134/111; 134/168 R; 366/138
(58) Field of Search ............................ 134/22.1, 22.18, 134/174, 180, 166 R, 198, 111, 110, 168 R; 366/138

(56) References Cited

U.S. PATENT DOCUMENTS

| | | | |
|---|---|---|---|
| 3,042,553 A | | 7/1962 | Kearney et al. ............. 134/169 |
| 3,291,144 A | | 12/1966 | Diamond .................... 134/111 |
| 4,285,808 A | * | 8/1981 | Horton |
| 4,422,767 A | | 12/1983 | Yelton ......................... 366/138 |
| 4,585,355 A | * | 4/1986 | Waitzinger |
| 5,127,740 A | * | 7/1992 | DeBoer |
| 5,178,455 A | * | 1/1993 | Ohsaki et al. |
| 5,605,398 A | | 2/1997 | Cronquist .................... 366/68 |
| 5,685,978 A | | 11/1997 | Petrick et al. ............. 210/241 |
| 5,741,065 A | | 4/1998 | Bell et al. .................. 366/541 |
| 5,899,217 A | | 5/1999 | Testman, Jr. ............. 134/104.4 |
| 6,039,468 A | * | 3/2000 | Kowalcyzk |
| 6,155,277 A | | 12/2000 | Barry ....................... 134/104.4 |
| 6,418,948 B1 | * | 7/2002 | Harmon |

FOREIGN PATENT DOCUMENTS

| | | |
|---|---|---|
| CA | 2267582 | 12/2001 |
| EP | 0034539 | 8/1981 |
| GB | 2147012 | 5/1985 |
| JP | 1049604 | 2/1989 |
| JP | 8-198003 | * 8/1996 |

OTHER PUBLICATIONS

Joe Chaitlain, Bruce Clague, Jun. 24, 1997, Disclosure Document Program submission.

* cited by examiner

*Primary Examiner*—Frankie L. Stinson
(74) *Attorney, Agent, or Firm*—Oyen Wiggs Green & Mutala

(57) ABSTRACT

An apparatus and method for containing and filtering rinse water, sediment and aggregate resulting from washing the hopper and discharge chute components of a concrete truck at a construction site following use comprises a container (20) removably mountable on the end of the discharge chute (18), the container (20) having an open upper end (31), a screen (23) removably positionable within the container (20) and an outlet (29) located in a lower portion of the container (20) below the screen (23). The apparatus further includes a pump (32) mountable on the truck, the pump (32) having a suction hose (34) extending between the container outlet (29) and the pump (32), and a discharge hose (36) extending from the pump (32) to an open end discharging into the mixing drum (14). When the pump (32) is operating, rinse water and relatively small particle size sediment flushed down the chute (18) and into the container (20) is automatically conveyed through the suction (34) and discharge (36) hoses into the mixing drum (14).

17 Claims, 5 Drawing Sheets

ON-SITE CONCRETE TRUCK WASH-OUT APPARATUS

TECHNICAL FIELD

This application relates to an apparatus and method for containing and filtering rinse water, sediment and aggregate resulting from washing the hopper and discharge chute components of a concrete truck at a construction site after use. The apparatus includes a truck-mounted pump for automatically recirculating the rinse water and relatively small particle size sediment from a container mountable at the end of the discharge chute to the mixing drum of the concrete truck.

BACKGROUND

Conventional concrete trucks include large drum containers for mixing aggregate, sand and cement slurry together. The concrete is discharged from the drum into a hopper and down a chute to the desired discharge location, such as into a concrete pump or bucket.

After concrete has been fully discharged from the truck, the operator must rinse debris adhering to the discharge hopper and outlet chute before leaving the construction site. Accordingly, the contractor must provide a designated location at the construction site where this rinsing operation may occur. This is often inconvenient and inefficient, especially if the rinsing station is located at a site remote from the concrete discharge location.

Moreover, concrete truck wash-off can pose serious environmental concerns. In many cases precautions must be taken at the construction site to ensure that sediment and cementitious debris does not contaminate the site or adjoining waterways. Enforcement of environmental regulations at construction sites is becoming increasingly stringent and hence it is anticipated that this issue will become more prominent in the future.

Some concrete supply companies have developed truck-mounted wash-off containment systems in attempt to address this problem. However, existing systems are unreliable and are not user-friendly. According to one existing system developed by Lafarge Canada Inc., a funnel is removably mounted at the end of the truck discharge chute before the hopper and chute are rinsed. The funnel directs rinse water and sediment adhering to the hopper and chute into a 5 gallon bucket which is positioned on the ground. The operator is then required to lift the bucket and carry it to a 15 gallon pressurized tank which is mounted on a truck frame immediately behind the truck cab. The contents of the bucket are then carefully dumped into the tank inlet through a metal screen which filters out larger size aggregate granules. After the tank is pressurized, a discharge valve is opened and the sediment and rinse water is blown through a discharge hose into the truck mixing drum.

The Lafarge system suffers from several shortcomings. The need to manually lift the 5 gallon containment bucket from ground level, carry the bucket to the pressurized tank, and carefully discharge the bucket contents into the pressurized tank inlet mounted at waist level requires considerable manual labour and increases the risk of lower back injuries, especially in older workers.

The valves of the pressurized tank also have a tendency to become clogged with slurry. This increases maintenance costs and results in reduced operator compliance. Further, depending upon the location where the pressurized tank is mounted, it may not be possible to generate a sufficient degree of air pressure in the tank to fully discharge the entire tank contents into the truck mixing drum which exacerbates the clogging problem.

The need has therefore arisen for an improved system for containing concrete truck wash-off and automatically recirculating it back into the mixing drum of the truck.

SUMMARY OF THE INVENTION

In accordance with the invention, a wash-off containment and recirculating apparatus is described for use in association with a concrete truck having a mixing drum and a discharge chute. The apparatus comprises a container removably mountable on the end of the discharge chute, the container having an open upper end, a screen removably positionable within the container and an outlet located in a lower portion of the container below the screen. The apparatus further includes a pump mountable on the truck, the pump having a suction hose extending between the container outlet and the pump; and a discharge hose extending from the pump to an open end discharging into the mixing drum. When the pump is operating, rinse water and relatively small particle size sediment flowing down the chute and into the container is automatically conveyed through the suction and discharge hoses into the mixing drum. Preferably, the screen has openings approximately ¼ inches in diameter to trap relatively large particle size aggregate, thereby preventing clogging of the pump fittings.

The screen may further include a handle on its upper surface for lifting the screen and any of the relatively large particle size aggregate which has accumulated thereon from the container. Optionally, a filter may be mounted in the container outlet as an additional safeguard.

Preferably the pump comprises an air-operated diaphragm pump connectable to the pressurized air supply of the truck. In order to minimize the length of the discharge hose, the pump is preferably mounted in a rear portion of the truck proximate the mixing drum. A frame may also be provided on the truck for securely storing the container when it is not in use.

BRIEF DESCRIPTION OF DRAWINGS

In drawing which illustrate the preferred embodiment of the invention, but which should not be construed as restricting the spirit or scope thereof.

DESCRIPTION

Figure 1:
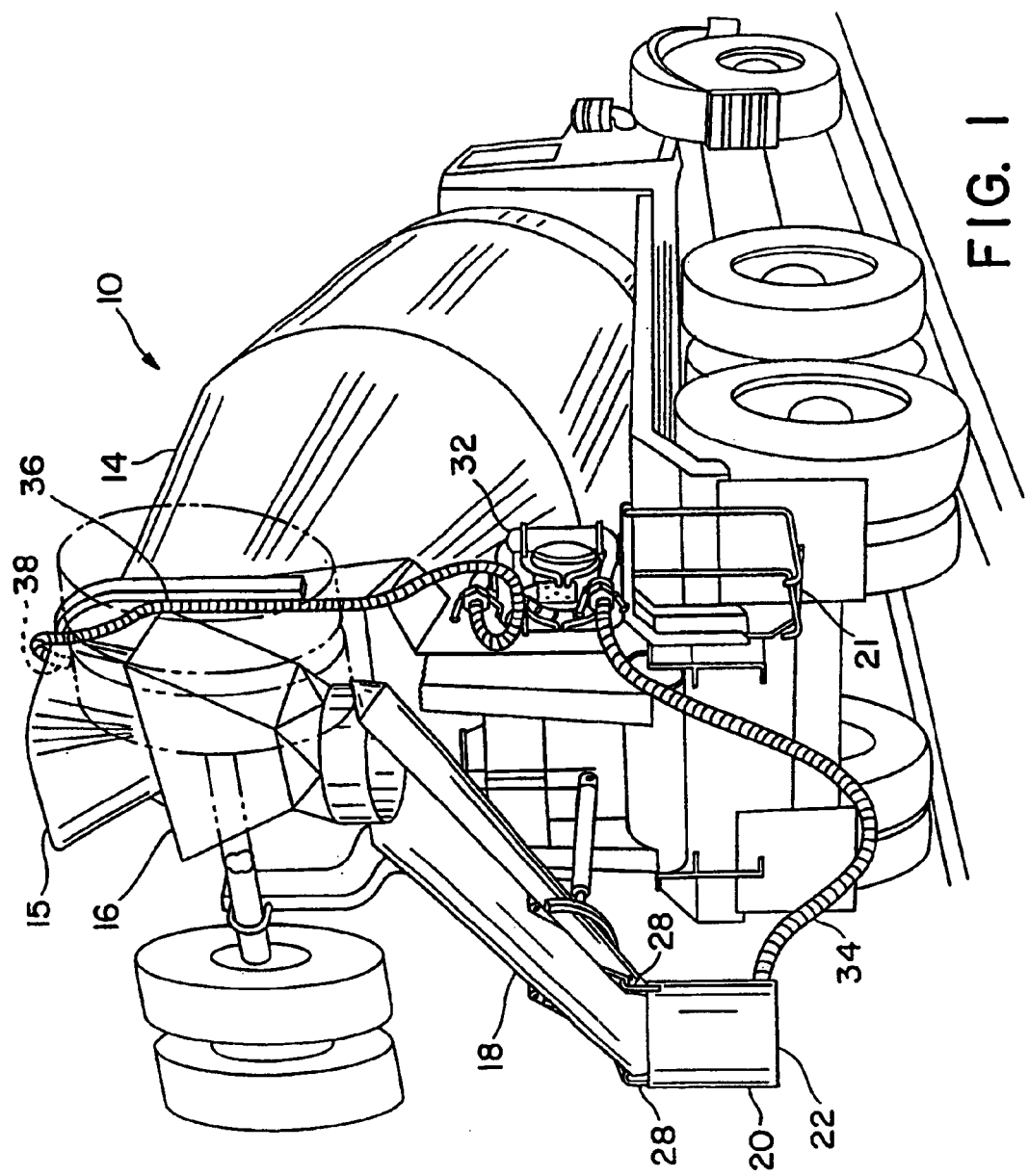
FIG. 1 is an isometric view of the applicant's wash-off containment and recirculating apparatus mounted on a conventional concrete mixing truck.

This application relates to a wash-off containment and recirculating apparatus for use in conjunction with a conventional concrete mixer truck 10. As shown in FIG. 1, truck 10 includes a large mixing drum 14 for mixing aggregate, sand and cement slurry together. Mix materials are introduced into drum 14 by means of a charging hopper 15.

Concrete is discharged from drum 14 into a discharge hopper 16 and down a chute 18 to the desired discharge location, such as into a concrete pump or bucket.

After concrete has been discharged from truck 10 as aforesaid, it is necessary to rinse discharge hopper 16 and chute 18 to remove any sediment or other cementitious debris before truck 10 exits the construction site. This rinsing step is usually performed at a designated wash-off station at the construction site. The purpose of the applicant's invention is to enable the rinsing step to be performed anywhere by containing the rinse water and sediment and automatically recirculating it to mixing drum 14, except for relatively large particle size aggregate which is disposed of separately.

Figure 2:
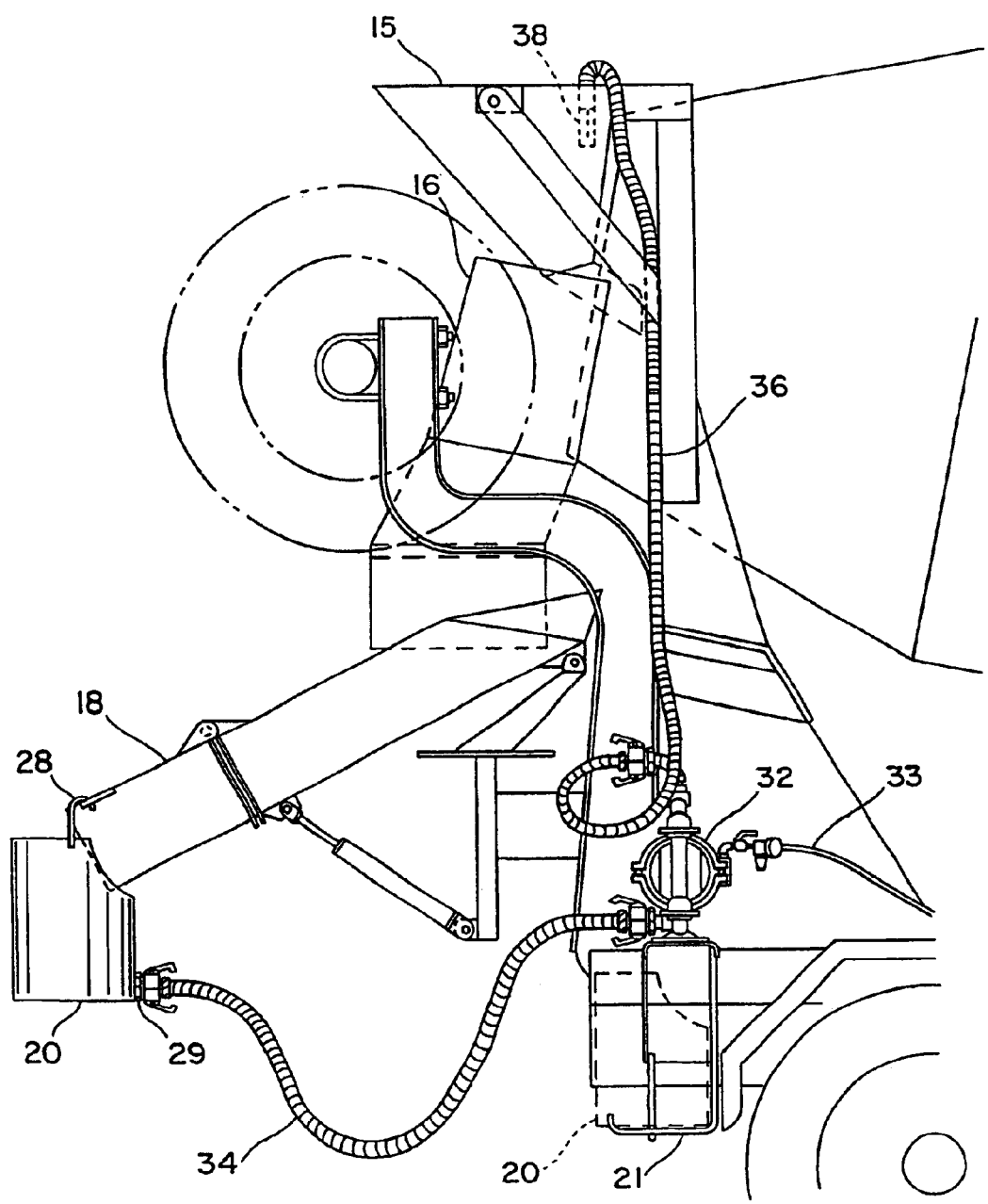
FIG. 2 is a side elevational view of the apparatus of FIG. 1 and showing the container component in dotted outline in the storage position.

The applicant's apparatus includes a container 20 which is mounted on a frame 21 secured to truck 10 when not in use (FIG. 2). As shown best in FIG. 5, container 20 includes a closed bottom end 22, sidewalls 24 and an open upper end 31. A pair of hooks 28 are provided at the upper front end of container 20 for removably securing container 20 to the end of truck discharge chute 18 (FIG. 2). When secured to chute 18 as shown in FIG. 2, container 10 receives substantially all of the rinse water and debris flushed down chute 18. If multiple chute extensions have been used, then container 20 is mounted on the lowermost extension. Container 20 is preferably constructed from lightweight aluminum for ease of handling.

Figure 5:
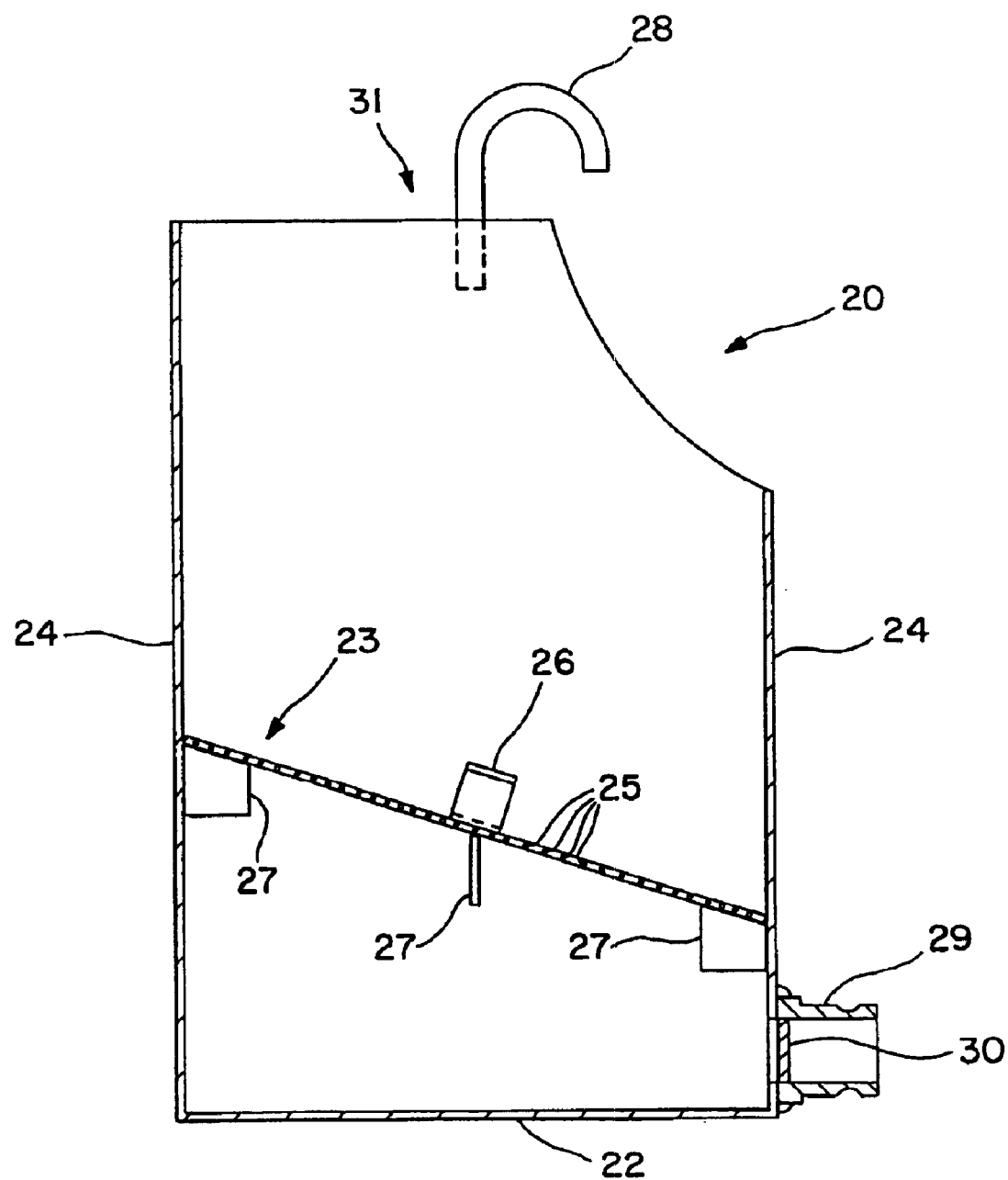
FIG. 5 is an enlarged cross-sectional view of the container component of the applicant's apparatus.

A screen 23 having a plurality of openings 25 is removably positionable within container 20 as shown best in FIG. 5. Openings 25 are approximately ¼ inch in diameter to permit the passage of rinse water and relatively small particle size sediment therethrough. Larger particle size aggregate is trapped by screen 23. Screen 23 has a handle 26 on its upper surface for ease in removing screen 23 and any accumulated aggregate from container 20. As shown in FIG. 5, screen 23 is removably supported on a plurality of metal tabs 27 within container 20 at an incline and at an elevation above closed bottom end 22.

Container 20 has an outlet port 29 located in a lower portion thereof below screen 23. A filter 30 is mounted in outlet port 29 to screen any large size aggregate or sediment particles which have passed into the container lower portion (due to misalignment of screen 23, for example).

The applicant's apparatus also includes a truck-mounted pump 32 having a suction hose 34 and a discharge hose 36 (FIGS. 1–4). Preferably pump 32 is an air operated diaphragm pump which is connectable to the pressurized air supply 33 of truck 10 (FIG. 2). A Wilden™ M4 air operated double diaphragm pump available from Wilden Pump & Engineering Company of Grand Terrace, Calif. is suitable for this purpose.

Figure 3:
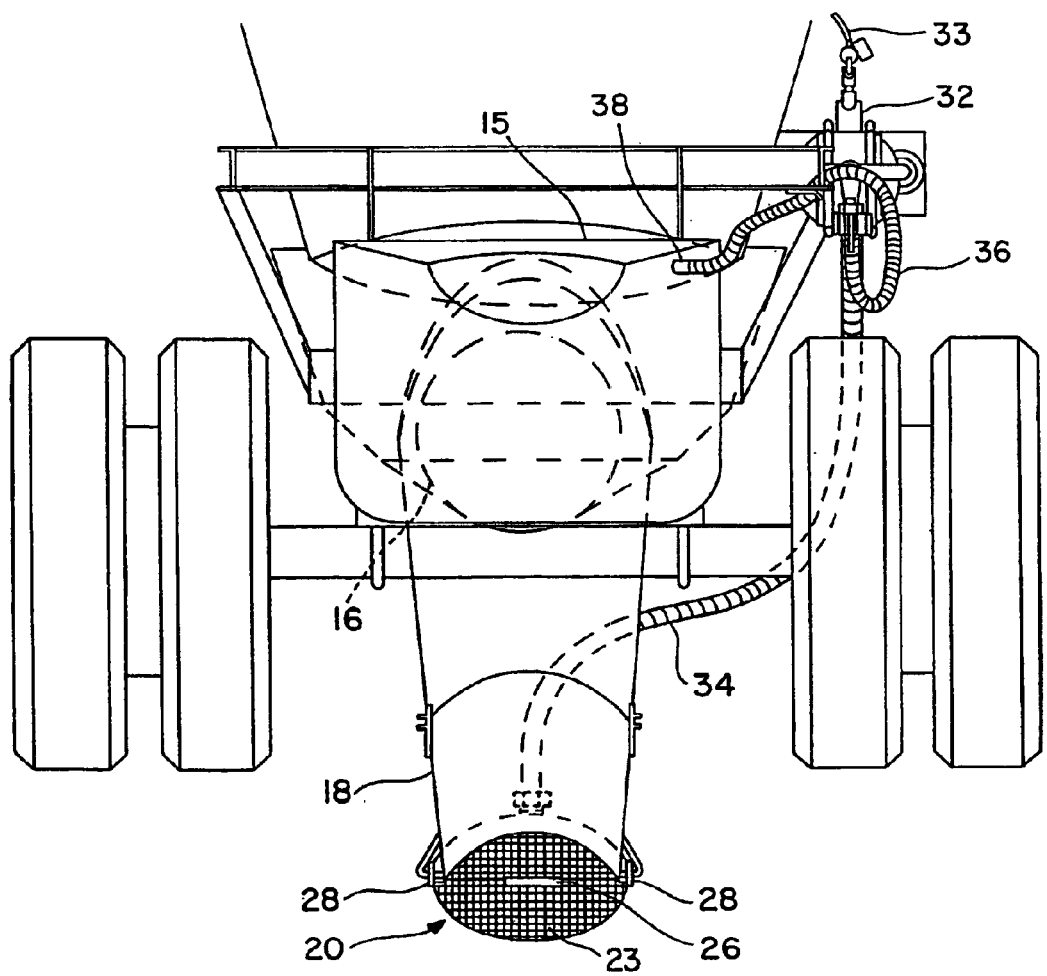
FIG. 3 is a top plan view of the apparatus of FIG. 1.
Figure 4:
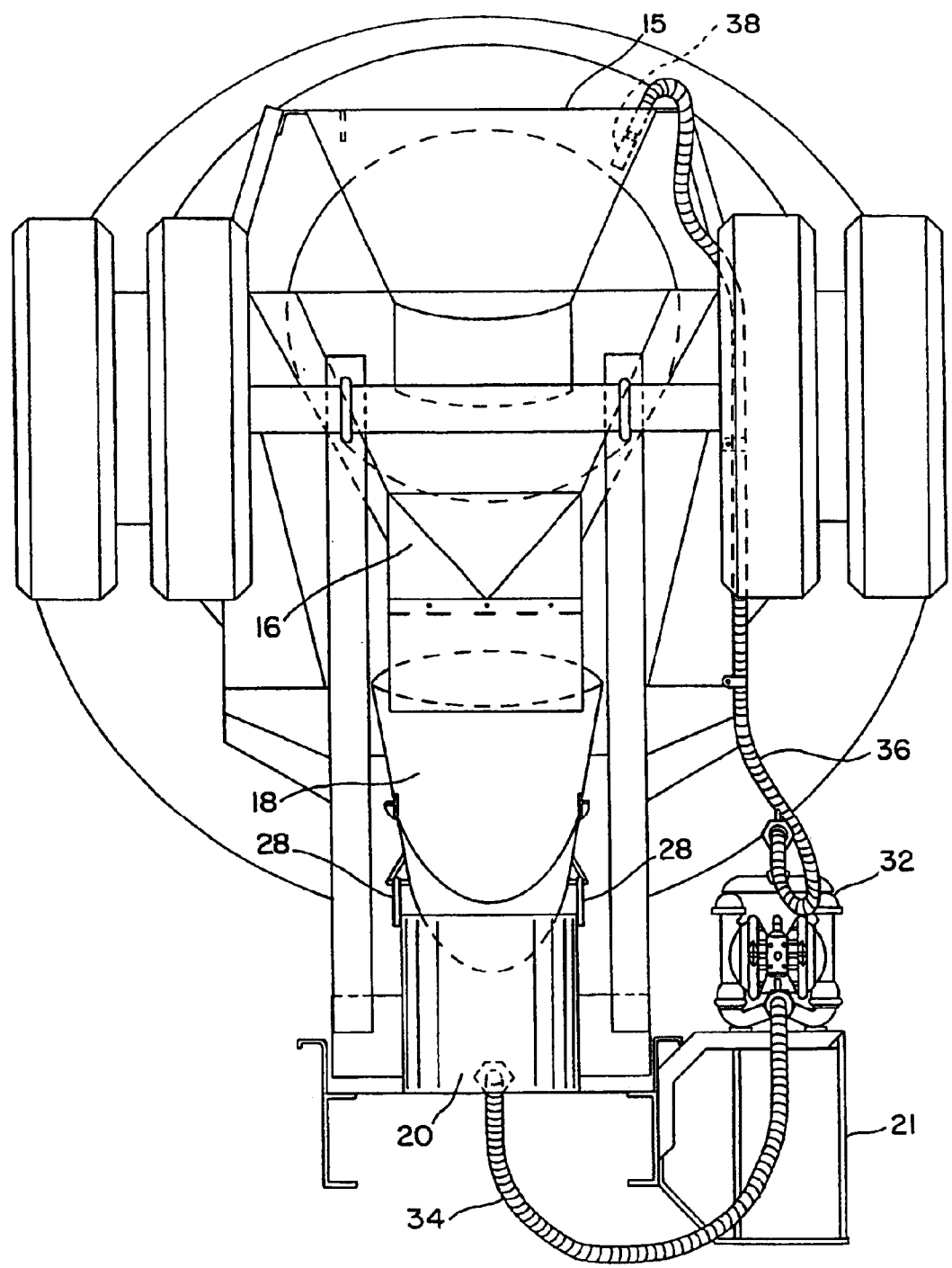
FIG. 4 is a rear elevational view of the apparatus of FIG. 1.

Suction hose 34, which is preferably about 1½ inches in diameter, connects pump 32 to container outlet port 29. Conventional male/female cam lock fittings may be used to ensure a secure connection. Discharge hose 36 has one end connected to pump 32 and an open end 38 emptying into charging hopper 15, as best shown in FIGS. 3 and 4. Discharge hose 36 is preferably secured to the outer surface of truck 10 with a plurality of brackets. Pump 32 is mounted on a rear side portion of truck 10 to minimize the length of discharge hose 36 and hence the effective pumping force required.

In use, concrete mixer truck operators are required to rinse the truck discharge hopper 16 and chute 18 after use before exiting a construction site. The rinsing operation can conveniently be performed at any location using the applicant's invention by first mounting container 20 at the end of chute 18 using hooks 28. Screen 23 is pre-positioned within container 20 and suction hose 34 is releasably secured to container outlet port 29 as discussed above.

The operator then activates pump 32 and thoroughly rinses discharge hopper 16 and chute 18 to flush any loose sediment or other debris into container 20. The rinse water and relatively small particle size sediment passes through screen 23 into the lower portion of container 20 where it is automatically drawn into suction hose 34 through outlet port 29. The rinse water and sediment is then conveyed by the action of pump 32 into the discharge hose 36 which empties into charging hopper 15 through open end 38 when hopper 15 is the upright position shown in the drawings (FIGS. 3 and 4). The recirculated rinse water and sediment then flows by gravitational forces down a sloped plate located at the bottom of charging hopper 15 back into mixing drum 14. The upper portion of discharge hose 36 is sufficiently flexible to accomodate pivoting movement of charging hopper 15 when the applicant's invention is not in use.

The larger size sediment particles and aggregate are trapped by screen 23. Screen 23 and any accumulated aggregate may be easily removed from container 20 by lifting screen 23 using handle 26. The accumulated aggregate may either be dumped at a suitable location at the construction site or returned to the concrete supply company for disposal.

As will be apparent to those skilled in the art in the light of the foregoing disclosure, many alterations and modifications are possible in the practice of this invention without departing from the spirit or scope thereof. For example, any suitable pump could be substituted for air operated diaphragm pump 32. Accordingly, the scope of the invention is to be construed in accordance with the substance defined by the following claims.

What is claimed is:

1. A wash-off containment and recirculating apparatus for use in association with a concrete truck having a mixing drum and a discharge chute, said apparatus comprising a container comprising an open upper end, a screen removably positionable within the container and an outlet located in a lower portion of the container below the screen, characterized in that said container is removably mountable on the end of said discharge chute and said apparatus further comprises:

(a) a pump mountable on said truck;

(b) a first hose portion connectable to said outlet; and (c) a second hose portion in communication with said first hose portion and having an open end emptying into said mixing drum;

wherein operation of said pump automatically conveys any rinse water and sediment capable of passing through said screen from said lower portion of said container to said mixing drum through said first and second hose portions.

2. The apparatus of claim 1, wherein said screen has a plurality of openings approximately ¼ inches in diameter for permitting said water and said sediment to pass therethrough but which prevents the passage of aggregate.

3. The apparatus of claim 2, wherein said screen further comprises a handle on its upper surface for lifting said screen and any of said aggregate which has accumulated thereon from said container.

4. The apparatus of claim 2, further comprising a filter mounted in said container outlet.

5. The apparatus of claim 1, wherein said pump comprises an air-operated diaphragm pump.

6. The apparatus of claim 5, wherein said pump is connectable to the pressurized air supply of said truck.

7. The apparatus of claim 1, wherein said first hose portion comprises a suction hose extending between said pump and said container outlet, and said second hose portion comprises a discharge hose extending from said pump to said mixing drum.

8. The apparatus of claim 7, wherein said pump is mountable in a rear portion of said truck proximate said mixing drum to minimize the length of said discharge hose.

9. The apparatus of claim 7, wherein the truck further includes a charging hopper in communication with the mixing drum and wherein said discharge hose is mountable on said truck so as to discharge into the charging hopper.

10. The apparatus of claim 1, further comprising a frame mountable on said truck for securely supporting said container when it is not in use.

11. A wash-off containment and recycling apparatus for use in association with a concrete truck having a mixing drum and a discharge chute, said apparatus comprising:

(a) a container removably mountable on the end of said discharge chute, said container comprising an upper portion having an open upper end, a screen removably positionable within said upper portion of said container, and an outlet located in a lower portion of said container below said screen and in fluid communication with said upper portion of said container;

(b) a hose connectable to said outlet and having an end emptying into said mixing drum; and (c) means for conveying any rinse water and relatively small size sediment capable for passing through said screen from said lower portion of said container to said mixing drum through said hose.

12. A wash-off containment and recycling apparatus for use in association with a concrete truck having a mixing drum and a discharge chute, said apparatus comprising:

(a) a container removably mountable on the end of said discharge chute, said container comprising an upper portion having an open upper end, a screen removably positionable within said upper portion of said container, and an outlet located in a lower portion of said container below said screen and in fluid communication with said upper portion of said container;

(b) a hose connectable to said outlet and having an end emptying into said mixing drum; and (c) a pump for automatically conveying any rinse water and relatively small size sediment capable of passing through said screen from said lower portion of said container to said mixing drum through said hose.

13. A method of rinsing a vehicle adapted for discharging concrete mix materials, the vehicle having a mixing drum, a discharge hopper and a discharge chute, characterized in that said method comprises:

(a) providing a container mountable on said vehicle, said container having a screen removably positionable within said container and an outlet located in a lower portion of said container below said screen;

(b) removably positioning said container at a lower end of said discharge chute;

(c) rinsing said discharge chute and discharge hopper with rinse water to wash sediment and aggregate present therein into said container; and (d) conveying said rinse water and sediment passing through said screen from said outlet of said container into said mixing drum.

14. The method of claim 13, wherein said container is removably mounted on a lower end of said discharge chute during said rinsing and pumping steps.

15. A method of rinsing a vehicle adapted for discharging concrete mix materials, the vehicle having a mixing drum, a discharge hopper and a discharge chute, characterized in that said method comprises:

(a) providing a container mountable on said vehicle, said container having a screen removably positionable within an upper portion of said container and an outlet located in a lower portion of said container below said screen, said lower portion of said container being in fluid communication with said upper portion of said container.

(b) removably positioning said container at a lower end of said discharge chute;

(c) rinsing said discharge chute and discharge hopper with rinse water to wash sediment and aggregate present therein into said container; and (d) conveying said rinse water and sediment passing through said screen from said outlet of said container into said mixing drum.

16. A wash-off containment and recirculating apparatus for use in association with a concrete truck having a mixing drum and a discharge chute, said apparatus comprising:

(a) a container removably mountable on the end of said discharge chute, said container comprising a first portion having an opening for receiving rinse water and solid debris washed off said discharge chute, a screen removably positionable within said first portion of said container, and an outlet located in a second portion of said container in fluid communication with said first portion of said container for receiving a portion of said solid debris capable of passing through said screen;

(b) conduit means connectable to said outlet and having a portion emptying into said mixing drum; and (c) means for conveying said portion of said solid debris capable of passing through said screen from said second portion of said container to said mixing drum through said conduit means.

17. A method of rinsing a vehicle adapted for discharging concrete mix materials, the vehicle having a mixing drum and a discharge chute, characterized in that said method comprises:

(a) providing a container mountable on said vehicle, said container having a screen removably positionable therein;

(b) removably positioning said container at a lower end of said discharge chute;

(c) rinsing said discharge chute with rinse water to wash solid debris present thereon into said container;

(d) passing said solid debris through said screen to separate said solid debris into a first relatively small particle size portion and a second relatively large particle size portion; and (d) conveying said rinse water and said first relatively small particle size portion from said container to said mixing drum.

* * * * *